US011336540B2

(12) United States Patent
Ye et al.

(10) Patent No.: US 11,336,540 B2
(45) Date of Patent: May 17, 2022

(54) SAMPLING FREQUENCY RECOMMENDATION METHOD, APPARATUS AND DEVICE, AND STORAGE MEDIUM

(71) Applicant: HUAWEI TECHNOLOGIES CO., LTD., Guangdong (CN)

(72) Inventors: Haonan Ye, Nanjing (CN); Liang Zhang, Nanjing (CN); Jian Cheng, Nanjing (CN); Jun Wu, Nanjing (CN); Li Xue, Nanjing (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 9 days.

(21) Appl. No.: 16/868,699

(22) Filed: May 7, 2020

(65) Prior Publication Data
US 2020/0267063 A1    Aug. 20, 2020

Related U.S. Application Data

(63) Continuation of application No. PCT/CN2018/114048, filed on Nov. 6, 2018.

(30) Foreign Application Priority Data

Nov. 8, 2017    (CN) .......................... 201711092524.8

(51) Int. Cl.
*H04L 12/26* (2006.01)
*H04L 12/24* (2006.01)
(Continued)

(52) U.S. Cl.
CPC ........ *H04L 43/024* (2013.01); *H04L 41/5009* (2013.01); *H04L 41/5067* (2013.01);
(Continued)

(58) Field of Classification Search
CPC ............... H04L 43/024; H04L 41/5009; H04L 41/5067; H04L 43/08; H04L 43/16; H04L 65/80; H04L 43/0829; H04L 43/0864
See application file for complete search history.

(56) References Cited

U.S. PATENT DOCUMENTS 9,130,825 B2    9/2015 Wilkinson
9,215,151 B1*  12/2015 De Rosa ............... H04L 43/024
(Continued)

FOREIGN PATENT DOCUMENTS

CN    101379764 A    3/2009
CN    104063467 A    9/2014
(Continued)

OTHER PUBLICATIONS

Li Wen-wei et el.:"A Network Packet Loss Rate Measurement Method Based on Self-adaptive Sampling",Mar. 2014,total 6 pages.

Primary Examiner — Hamza N Algibhah
Assistant Examiner — James Ross Hollister
(74) Attorney, Agent, or Firm — Womble Bond Dickinson (US) LLP

(57) ABSTRACT

A sampling frequency recommendation method, apparatus, and device, and a storage medium relating to the field of communications technologies are disclosed. The sampling frequency recommendation method includes: obtaining a network key performance indicator of a to-be-analyzed data stream; sampling the network key performance indicator based on a plurality of different sampling frequencies to obtain an experience quality sequence corresponding to each sampling frequency, where the plurality of different sampling frequencies include one standard sampling frequency and at least two to-be-tested sampling frequencies, and the standard sampling frequency is greater than each to-be-tested sampling frequency; and determining a matching degree between an experience quality sequence correspond- (Continued)

ing to each to-be-tested sampling frequency and a standard experience quality sequence, and determining a recommended sampling frequency based on the matching degree between the experience quality sequence corresponding to each to-be-tested sampling frequency and the standard experience quality sequence.

19 Claims, 5 Drawing Sheets

(51) Int. Cl.
      *H04L 29/06*     (2006.01)
      *H04L 43/024*    (2022.01)
      *H04L 41/5009*   (2022.01)
      *H04L 41/5067*   (2022.01)
      *H04L 43/08*     (2022.01)
      *H04L 43/16*     (2022.01)
      *H04L 65/80*     (2022.01)

(52) U.S. Cl.
    CPC .............. *H04L 43/08* (2013.01); *H04L 43/16* (2013.01); *H04L 65/80* (2013.01)

(56) References Cited

U.S. PATENT DOCUMENTS

| | | | |
|---|---|---|---|
| 2007/0263775 | A1 | 11/2007 | Clark |
| 2013/0166730 | A1* | 6/2013 | Wilkinson .......... H04L 41/5009 709/224 |
| 2013/0272144 | A1* | 10/2013 | Dong .................... H04W 24/10 370/252 |
| 2016/0065419 | A1* | 3/2016 | Szilagyi .............. G06F 11/3006 709/224 |

FOREIGN PATENT DOCUMENTS

| | | |
|---|---|---|
| CN | 104507105 A | 4/2015 |
| CN | 104980962 A | 10/2015 |
| CN | 106452983 A | 2/2017 |
| WO | 2013059930 A1 | 5/2013 |

* cited by examiner

SAMPLING FREQUENCY RECOMMENDATION METHOD, APPARATUS AND DEVICE, AND STORAGE MEDIUM

CROSS-REFERENCE TO RELATED APPLICATIONS

This application is a continuation of International Application No. PCT/CN2018/114048, filed on Nov. 6, 2018, which claims priority to Chinese Patent Application No. 201711092524.8, filed on Nov. 8, 2017. The disclosures of the aforementioned applications are hereby incorporated by reference in their entireties.

TECHNICAL FIELD

The present disclosure relates to the field of communications technologies, and in particular, to a sampling frequency recommendation method, apparatus, and device, and a storage medium.

BACKGROUND

To evaluate network performance and optimize a network based on the network performance, a complete performance evaluation indicator system is provided for the network. A key performance indicator (KPI) of the network is used to evaluate the network performance. The key performance indicator may include features such as a load rate, a packet loss rate, and a delay of a device at each layer of the network.

For example, in a scenario of a data stream service, experience quality of the data stream service gradually becomes one of most concerned network performance. When a reliable transmission protocol such as a transmission control protocol (TCP) is used to transmit a data stream, poor experience quality of the data stream service is usually caused by an insufficient network device throughput rate. The insufficient network device throughput rate means that a throughput rate reckoned by a network device cannot reach a bit rate of a currently played video. In a case of insufficient network device throughput rate, the experience quality of the data stream service is relatively poor. To identify the experience quality of the data stream service, a data transmission device needs to collect a network key performance indicator of the network, and a data analysis center samples the collected network key performance indicator, and determines, based on a sampling result, whether the experience quality of the data stream service is good or poor. Because the experience quality of the data stream service becomes poor by accident, a higher sampling frequency for sampling the network key performance indicator leads to a stronger capability of identifying the experience quality of the data stream service. However, when a high sampling frequency is used, a large amount of sampled data needs to be stored and analyzed. Consequently, a large quantity of storage resources and computing resources of a data analysis device are occupied, thereby degrading network performance. However, a low sampling frequency reduces accuracy of identifying the experience quality of the data stream service.

SUMMARY

The present disclosure provides a sampling frequency recommendation method, apparatus, and device, and a storage medium, to make a balance between a network experience quality identification capability and a network failure detection capability, and network performance.

According to a first aspect, the present disclosure provides a sampling frequency recommendation method, including: obtaining a network key performance indicator of a to-be-analyzed data stream; sampling the network key performance indicator based on a plurality of different sampling frequencies to obtain an experience quality sequence corresponding to each sampling frequency, where the plurality of different sampling frequencies include one standard sampling frequency and at least two to-be-tested sampling frequencies, the standard sampling frequency is greater than each to-be-tested sampling frequency, the experience quality sequence corresponding to each sampling frequency includes experience quality elements of sampling periods arranged in an order of time, and the experience quality element of each sampling period is used to represent experience quality determined based on the network key performance indicator in the sampling period; and determining a matching degree between an experience quality sequence corresponding to each to-be-tested sampling frequency and a standard experience quality sequence, and determining a recommended sampling frequency based on the matching degree between the experience quality sequence corresponding to each to-be-tested sampling frequency and the standard experience quality sequence, where the matching degree corresponding to the recommended sampling frequency meets an expected condition, and the standard experience quality sequence corresponds to the standard sampling frequency.

A higher sampling frequency leads to a stronger capability of identifying the network experience quality based on the network key performance indicator obtained through sampling at the sampling frequency. Therefore, the standard experience quality sequence can reflect the network experience quality of a network as far as possible. The matching degree may represent a similarity degree between the standard experience quality sequence and the experience quality sequence corresponding to the to-be-tested sampling frequency. In other words, the matching degree may represent accuracy of identifying the network experience quality. The matching degree that meets a requirement may be obtained by using the expected condition, and then the recommended sampling frequency corresponding to the matching degree that meets the requirement is obtained. Therefore, the recommended sampling frequency is used to make a balance between a network experience quality identification capability and network performance.

With reference to the first aspect, in a first possible implementation of the first aspect, the sampling the network key performance indicator based on a plurality of different sampling frequencies to obtain an experience quality sequence corresponding to each sampling frequency includes: calculating, for each sampling frequency, a network throughput rate in each sampling period based on a network key performance indicator obtained through sampling at the sampling frequency, obtaining a bit rate of each sampling period, and comparing the network throughput rate and the bit rate in the same sampling period, to obtain experience quality elements corresponding to a plurality of sampling periods, where the experience quality element includes a good quality state or a poor quality state, the good quality state represents that the network throughput rate is greater than or equal to the bit rate in the same sampling period, and the poor quality state represents that the network throughput rate is less than the bit rate in the same sampling period.

Based on comparison between a network throughput rate and a real-time bit rate, the experience quality element is binarized, and the experience quality element is in a good quality state or a poor quality state. This better helps determine whether a to-be-analyzed data stream is in a good quality state or a poor quality state when sampling is performed at the sampling frequency. The poor quality state may be a poor quality state caused by lag. The experience quality sequence may be constituted by using the good quality state and the poor quality state. Therefore, by using the matching degree between the experience quality sequence corresponding to the to-be-tested sampling frequency and the standard experience quality sequence that can reflect the network experience quality as exactly as possible, a capability that can reflect the standard experience quality sequence by using the to-be-tested sampling frequency is obtained. Therefore, accuracy of detecting and identifying the network experience quality and a network failure through sampling based on the to-be-tested sampling frequency is obtained more exactly.

With reference to the first aspect or the first possible implementation of the first aspect, in a second possible implementation of the first aspect, the determining a matching degree between an experience quality sequence corresponding to each to-be-tested sampling frequency and a standard experience quality sequence includes: performing calculation based on the experience quality elements in the standard experience quality sequence and the experience quality elements in the experience quality sequence corresponding to the to-be-tested sampling frequency, to obtain the matching degree between the experience quality sequence corresponding to the to-be-tested sampling frequency and the standard experience quality sequence.

With reference to the second possible implementation of the first aspect, in a third possible implementation of the first aspect, a quantity of experience quality elements in the standard experience quality sequence is N, a quantity of experience quality elements in the experience quality sequence corresponding to the to-be-tested sampling frequency is M, and both N and M are positive integers; and the performing calculation based on the experience quality elements in the standard experience quality sequence and the experience quality elements in the experience quality sequence corresponding to the to-be-tested sampling frequency, to obtain the matching degree between the experience quality sequence corresponding to the to-be-tested sampling frequency and the standard experience quality sequence includes: combining every N/M consecutive experience quality elements in the standard experience quality sequence into one experience quality element, where N/M is a positive integer; and calculating a proportion of a quantity of target experience quality elements in a quantity of experience quality elements in the experience quality sequence corresponding to the to-be-tested sampling frequency, and using the proportion as the matching degree between the experience quality sequence corresponding to the to-be-tested sampling frequency and the standard experience quality sequence, where the target experience quality element is an experience quality element that is in the experience quality sequence corresponding to the to-be-tested sampling frequency and that is the same as an experience quality element of a corresponding sampling period in the standard experience quality sequence obtained after combination of the experience quality elements.

Quantities of experience quality elements in the experience quality sequences obtained at different sampling frequencies are different. Through combination, the experience quality sequences that include different quantities of experience quality elements may be compared with each other, so that an applicable scope of the sampling frequency recommendation method is expanded.

With reference to the third possible implementation of the first aspect, in a fourth possible implementation of the first aspect, in the standard experience quality sequence, if at least one of every N/M consecutive experience quality elements is in a poor quality state, the experience quality element obtained by combining the N/M consecutive experience quality elements is in the poor quality state.

With reference to any one of the first aspect, or the first to the fourth possible implementations of the first aspect, in a fifth possible implementation of the first aspect, the determining a recommended sampling frequency based on the matching degree between the experience quality sequence corresponding to each to-be-tested sampling frequency and the standard experience quality sequence includes: calculating, for each to-be-tested sampling frequency, a statistical value of matching degrees between experience quality sequences of a plurality of the to-be-analyzed data streams corresponding to the to-be-tested sampling frequency and the standard experience quality sequence, where the statistical value includes an average value or a median value; using a to-be-tested sampling frequency whose statistical value of the matching degrees falls within an expected matching degree range as a target sampling frequency; and using a minimum sampling frequency in the target sampling frequencies as the recommended sampling frequency.

In addition to meeting the expected accuracy of detecting and identifying the network experience quality and a network failure, selecting a target sampling frequency with a minimum sampling frequency as the recommended sampling frequency minimizes a performance requirement on a data analysis device, thereby avoiding adverse impact on overall network performance.

With reference to any one of the first aspect, or the first to the fourth possible implementations of the first aspect, in a sixth possible implementation of the first aspect, the determining a recommended sampling frequency based on the matching degree between the experience quality sequence corresponding to each to-be-tested sampling frequency and the standard experience quality sequence includes: calculating, for each to-be-tested sampling frequency, matching degrees between experience quality sequences of a plurality of the to-be-analyzed data streams corresponding to the to-be-tested sampling frequency and the standard experience quality sequence; and selecting, for each to-be-analyzed data stream, a minimum sampling frequency from the to-be-tested sampling frequencies whose matching degrees fall within an expected matching degree range, and using a most frequently selected to-be-tested sampling frequency as the recommended sampling frequency.

With reference to any one of the first aspect, or the first to the sixth possible implementations of the first aspect, in a seventh possible implementation of the first aspect, the obtaining a network key performance indicator of a to-be-analyzed data stream collected by a data transmission device includes: selecting a data stream whose experience quality does not reach standard experience quality as the to-be-analyzed data stream, and obtaining the network key performance indicator of the to-be-analyzed data stream.

A data stream with good experience quality is excluded, and a data stream with relatively poor experience quality is screened as the to-be-analyzed data stream, so that sampling and analysis on the data stream with the good experience quality may be avoided, and resources and time for sampling and analysis are saved, thereby improving a speed and efficiency of obtaining the recommended sampling frequency.

With reference to the first aspect, in an eighth possible implementation of the first aspect, the foregoing sampling frequency recommendation method further includes: redetermining the recommended sampling frequency if the expected condition is updated or a variation of the network key performance indicator exceeds a normal variation threshold.

When a requirement for the accuracy of identifying the network experience quality and the network failure changes significantly, or when a network status changes significantly, the original accuracy of identifying the network experience quality and the network failure for the network is no longer applicable to a current network, and adaptive update and adaptive optimization recommended by the sampling frequency may be implemented based on a latest network key performance indicator, thereby maintaining optimal network performance.

According to a second aspect, the present disclosure provides a sampling frequency recommendation apparatus, including: an obtaining module, configured to obtain a network key performance indicator of a to-be-analyzed data stream; a sampling module, configured to sample the network key performance indicator based on a plurality of different sampling frequencies to obtain an experience quality sequence corresponding to each sampling frequency, where the plurality of different sampling frequencies include one standard sampling frequency and at least two to-be-tested sampling frequencies, the standard sampling frequency is greater than each to-be-tested sampling frequency, the experience quality sequence corresponding to each sampling frequency includes experience quality elements of sampling periods arranged in an order of time, the experience quality element of each sampling period is used to represent experience quality determined based on the network key performance indicator in the sampling period, and duration of the sampling period corresponds to the sampling frequency; and a recommendation module, configured to: determine a matching degree between an experience quality sequence corresponding to each to-be-tested sampling frequency and a standard experience quality sequence, and determine a recommended sampling frequency based on the matching degree between the experience quality sequence corresponding to each to-be-tested sampling frequency and the standard experience quality sequence, where the matching degree corresponding to the recommended sampling frequency meets an expected condition, and the standard experience quality sequence corresponds to the standard sampling frequency.

With reference to the second aspect, in a first possible implementation of the second aspect, the sampling module is specifically configured to: calculate, for each sampling frequency, a network throughput rate in each sampling period based on a network key performance indicator obtained through sampling at the sampling frequency, obtain a bit rate of each sampling period, and compare the network throughput rate and the bit rate in the same sampling period, to obtain experience quality elements corresponding to a plurality of sampling periods, where the experience quality element includes a good quality state or a poor quality state, the good quality state represents that the network throughput rate is greater than or equal to the bit rate in the same sampling period, and the poor quality state represents that the network throughput rate is less than the bit rate in the same sampling period.

With reference to the second aspect or the first possible implementation of the second aspect, in a second possible implementation of the second aspect, when determining the matching degree between the experience quality sequence corresponding to the to-be-tested sampling frequency and the standard experience quality sequence, the recommendation module is specifically configured to: perform calculation based on the experience quality elements in the standard experience quality sequence and the experience quality elements in the experience quality sequence corresponding to the to-be-tested sampling frequency, to obtain the matching degree between the experience quality sequence corresponding to the to-be-tested sampling frequency and the standard experience quality sequence.

With reference to the second possible implementation of the second aspect, in a third possible implementation of the second aspect, a quantity of experience quality elements in the standard experience quality sequence is N, a quantity of experience quality elements in the experience quality sequence corresponding to the to-be-tested sampling frequency is M, and both N and M are positive integers; and when performing calculation based on the experience quality elements in the standard experience quality sequence and the experience quality elements in the experience quality sequence corresponding to the to-be-tested sampling frequency, to obtain the matching degree between the experience quality sequence corresponding to the to-be-tested sampling frequency and the standard experience quality sequence, the recommendation module is specifically configured to: combine every N/M consecutive experience quality elements in the standard experience quality sequence into one experience quality element, where N/M is a positive integer; and calculate a proportion of a quantity of target experience quality elements in a quantity of experience quality elements in the experience quality sequence corresponding to the to-be-tested sampling frequency, and use the proportion as the matching degree between the experience quality sequence corresponding to the to-be-tested sampling frequency and the standard experience quality sequence, where the target experience quality element is an experience quality element that is in the experience quality sequence corresponding to the to-be-tested sampling frequency and that is the same as an experience quality element of a corresponding sampling period in the standard experience quality sequence obtained after combination of the experience quality elements.

With reference to the third possible implementation of the second aspect, in a fourth possible implementation of the second aspect, in the standard experience quality sequence, if at least one of every N/M consecutive experience quality elements is in a poor quality state, the experience quality element obtained by combining the N/M consecutive experience quality elements is in the poor quality state.

With reference to any one of the second aspect, or the first to the fourth possible implementations of the second aspect, in a fifth possible implementation of the second aspect, when determining the recommended sampling frequency based on the matching degree between the experience quality sequence corresponding to each of the to-be-tested sampling frequencies and the standard experience quality sequence, the recommendation module is specifically configured to: calculate, for each to-be-tested sampling frequency, a statistical value of matching degrees between experience quality sequences of a plurality of the to-be-analyzed data streams corresponding to the to-be-tested sampling frequency and the standard experience quality sequence, where the statistical value includes an average value or a median value; use a to-be-tested sampling frequency whose statistical value of the matching degrees falls within an expected matching degree range as a target sampling frequency; and use a minimum sampling frequency in the target sampling frequencies as the recommended sampling frequency.

With reference to any one of the second aspect, or the first to the fourth possible implementations of the second aspect, in a sixth possible implementation of the second aspect, when determining the recommended sampling frequency based on the matching degree between the experience quality sequence corresponding to each to-be-tested sampling frequency and the standard experience quality sequence, the recommendation module is specifically configured to: calculate, for each to-be-tested sampling frequency, matching degrees between experience quality sequences of a plurality of the to-be-analyzed data streams corresponding to the to-be-tested sampling frequency and the standard experience quality sequence; and select, for each to-be-analyzed data stream, a minimum sampling frequency from the to-be-tested sampling frequencies whose matching degrees fall within an expected matching degree range, and use a most frequently selected to-be-tested sampling frequency as the recommended sampling frequency.

With reference to any one of the second aspect, or the first to the sixth possible implementations of the second aspect, in a seventh possible implementation of the second aspect, the obtaining module is specifically configured to: select a data stream whose experience quality does not reach standard experience quality as the to-be-analyzed data stream, and obtain the network key performance indicator of the to-be-analyzed data stream.

With reference to the second aspect, in an eighth possible implementation of the second aspect, the foregoing sampling frequency recommendation apparatus further includes: an update execution module, configured to: if the expected condition is updated or a variation of the key performance indicator exceeds a normal variation threshold, trigger the obtaining module, the sampling module, and the recommendation module to redetermine the recommended sampling frequency.

According to a third aspect, the present disclosure provides a sampling frequency recommendation device, including a memory, a processor, and a program that is stored in the memory and that is executable on the processor. When the processor executes the program, the sampling frequency recommendation method in the foregoing technical solution is implemented.

According to a fourth aspect, the present disclosure provides a storage medium, where the storage medium stores a program, and when the program is executed by a processor, the sampling frequency recommendation method in the foregoing technical solution is implemented.

The present disclosure provides a sampling frequency recommendation method, apparatus, and device, and a storage medium. The network key performance indicator of the to-be-analyzed data stream is sampled based on a plurality of different sampling frequencies to obtain the experience quality sequence corresponding to each sampling frequency. The experience quality sequence includes experience quality elements, and the experience quality sequence may represent the experience quality determined based on the network key performance indicator. The recommended sampling frequency is determined by using the matching degree between the experience quality sequence corresponding to the to-be-tested sampling frequency and the standard experience quality sequence. The standard experience quality sequence corresponds to the standard sampling frequency, and the standard sampling frequency is greater than all the to-be-tested sampling frequencies. A higher sampling frequency leads to a stronger capability of identifying the network experience quality based on the network key performance indicator obtained through sampling at the sampling frequency. Therefore, the standard experience quality sequence can reflect the network experience quality of a network as far as possible. The matching degree may represent a similarity degree between the standard experience quality sequence and the experience quality sequence corresponding to the to-be-tested sampling frequency. In other words, the matching degree may represent accuracy of identifying the network experience quality. The matching degree that meets a requirement may be obtained by using the expected condition, and then the recommended sampling frequency corresponding to the matching degree that meets the requirement is obtained. Therefore, the recommended sampling frequency is used to make a balance between a network experience quality identification capability and network performance.

DESCRIPTION OF EMBODIMENTS

Figure 1:
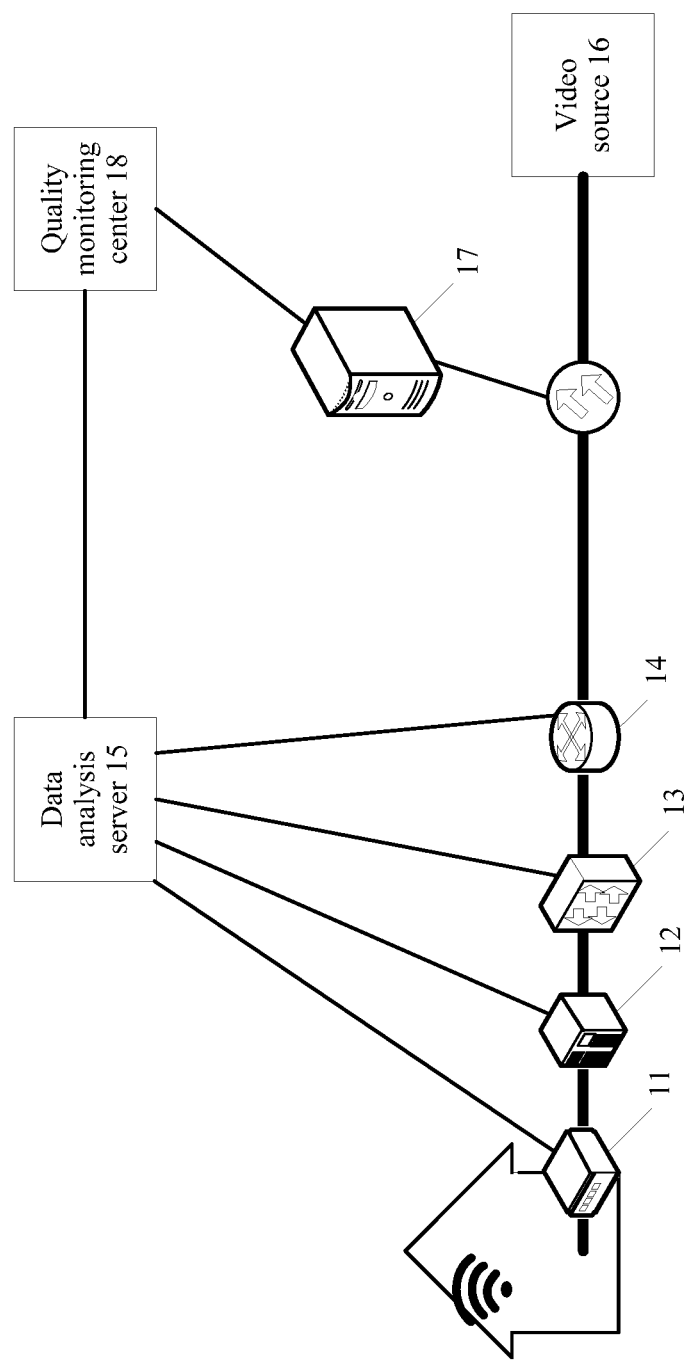
FIG. 1 is a schematic diagram of an application scenario of a sampling frequency recommendation method according to an embodiment of the present disclosure.

Embodiments of the present disclosure provide a sampling frequency recommendation method, apparatus, and device, and a storage medium, which may be applied to a scenario in which network experience quality is detected and identified. FIG. 1 is a schematic diagram of an application scenario of a sampling frequency recommendation method according to an embodiment of the present disclosure. As shown in FIG. 1, a sampling frequency recommendation system may include an optical network terminal 11 (ONT), an optical line terminal 12 (OLT), a broadband remote access server 13 (BRAS), a core router 14 (CR), a data analysis server 15 (DAS), a data stream source 16, a service inspection gateway 17 (SIG), and a quality monitoring center 18 (QMC). The data stream source 16 is a device that provides a data stream, and may be specifically a video server that provides a video data stream, for example, an Internet protocol television (IPTV) server. The optical network terminal 11, the optical line terminal 12, the broadband remote access server 13, and the core router 14 are all data transmission devices. A data collection apparatus may be deployed in or connected in bypass mode to any data transmission device. The data collection apparatus is used to collect network key performance indicator (KPI) data of each data stream, and the network key performance indicator data is aggregated to the data analysis server 15 for processing. The network key performance indicator data may include a data stream identifier and a network key performance indicator of a data stream identified by the data stream identifier. For example, the data stream identifier may include a 5-tuple and a time label, for example, the data stream is a video data stream, and the time label may be a start play time of the video data stream. The service inspection gateway 17 may collect data stream experience data based on the data stream, and aggregate the data stream experience data to the quality monitoring center 18 for processing. The data stream experience data may include a data stream identifier and a network key quality indicator (KQI) of a data stream identified by the data stream identifier. For example, the data stream identifier in the data stream experience data may include a 5-tuple and a time label, and may further include a user identifier. For example, the data stream is a video data stream, and the data stream identifier in the data stream experience data may further include a video identifier. When obtaining the network key performance indicator data of the data stream, the quality monitoring center 18 also obtains the data stream experience data of the data stream. The quality monitoring center 18 works together with the data analysis server 15, and the quality monitoring center 18 may associate a network key performance indicator with a network key quality indicator by using the data stream identifier for further analysis. Whether experience quality of the video data stream is good or poor may be indicated as good or poor experience in a video playing process. For example, if video playing lags, it may be considered as poor experience quality of the video data stream.

Figure 2:
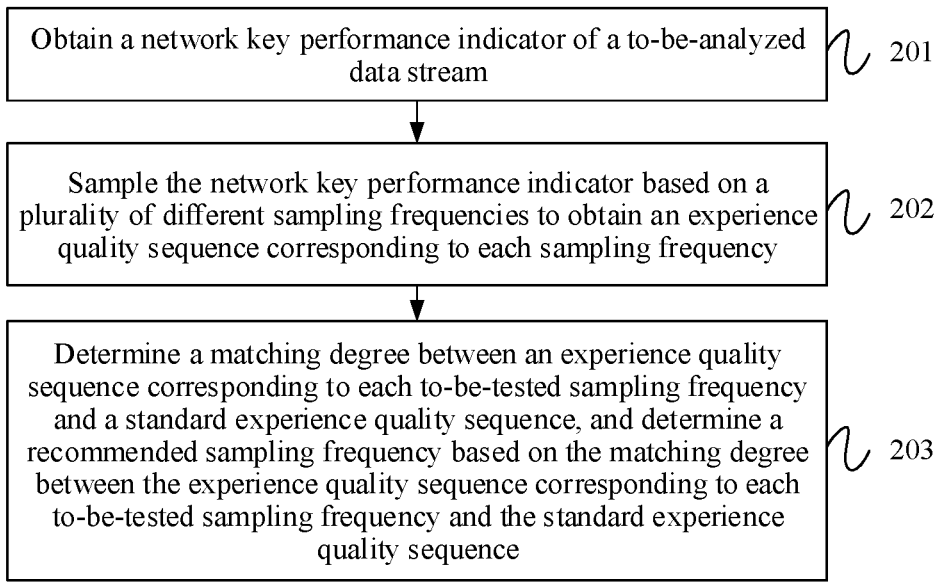
FIG. 2 is a flowchart of a sampling frequency recommendation method according to an embodiment of the present disclosure.

FIG. 2 is a flowchart of a sampling frequency recommendation method according to an embodiment of the present disclosure. As shown in FIG. 1, the sampling frequency recommendation method includes operation 201 to operation 203.

In operation 201, a network key performance indicator of a to-be-analyzed data stream is obtained.

A data stream source sends a plurality of data streams to a user terminal. A data stream identifier may uniquely identify a data stream. Data stream experience data may be collected by using a service inspection gateway based on the data stream sent by the data stream source, and the to-be-analyzed data stream is selected based on a network key quality indicator in the data stream experience data. In an example, a plurality of data streams may be randomly selected as the to-be-analyzed data streams. In another example, a data stream with poor experience quality may alternatively be selected from the data streams sent by the data stream source as the to-be-analyzed data stream. For example, the data stream is a video data stream. In this case, the network key performance indicator may include a lag time ratio, and a video data stream in which lag occurs during playing may be obtained based on the lag time ratio, so that the video data stream in which lag occurs during playing is selected as the to-be-analyzed data stream.

It should be noted that the to-be-analyzed data stream may be an entire data stream, or may be a part of the entire data stream. For example, a user watches a video 1 on a video server 1 by using a user terminal 1 for 30 consecutive minutes from 9:00 a.m.; in other words, the video server 1 provides a video data stream with duration of 30 minutes for the user terminal 1. In operation 201, the video data stream 1 may be directly used as the to-be-analyzed data stream, or a part (for example, the first 10 minutes of the video data stream or 10 minutes of the video data stream during which lag occurs) of the video data stream 1 may be used as the to-be-analyzed data stream.

In operation 202, the network key performance indicator is sampled based on a plurality of different sampling frequencies to obtain an experience quality sequence corresponding to each sampling frequency.

The plurality of different sampling frequencies include one standard sampling frequency and at least two to-be-tested sampling frequencies, and the standard sampling frequency is greater than each to-be-tested sampling frequency. For example, the plurality of different sampling frequencies include $1/30$ Hz, $1/60$ Hz, $1/120$ Hz, $1/180$ Hz, and $1/300$ Hz. In this case, $1/30$ Hz is the standard sampling frequency, and $1/60$ Hz, $1/120$ Hz, $1/180$ Hz, and $1/300$ Hz are all to-be-tested sampling frequencies. A higher sampling frequency leads to a stronger capability of detecting and identifying network experience quality based on the network key performance indicator collected based on the sampling frequency.

For each data stream, sampling is performed once based on each sampling frequency to obtain a network key performance indicator of each video data stream at each sampling frequency. In an example, specifically in a period of time, the network key performance indicator of the to-be-analyzed data stream collected by a data transmission device is sampled based on the plurality of different sampling frequencies. For example, the sampling frequencies include $1/30$ Hz, $1/60$ Hz, and $1/120$ Hz, where Hz is a frequency unit hertz. Duration of sampling periods corresponding to the foregoing sampling frequencies is respectively 30 s, 60 s, and 120 s, where s is a time unit second. For example, the network key performance indicator of the to-be-analyzed data stream with a length of 10 minutes is collected, and then the network key performance indicator of the to-be-analyzed video data stream is sampled respectively based on the sampling frequencies $1/30$ Hz, $1/60$ Hz, and $1/120$ Hz. In other words, one group of network key performance indicators of the to-be-analyzed data stream are obtained through sampling based on the sampling frequency $1/30$ Hz, another group of network key performance indicators of the to-be-analyzed data stream are obtained through sampling based on the sampling frequency $1/60$ Hz, and still another group of network key performance indicators of the to-be-analyzed data stream are obtained through sampling based on the sampling frequency $1/120$ Hz.

In an example, the network key performance indicators may include a round-trip time (RTT), a packet loss rate (PLR), and a maximum segment size (MSS). The round-trip time may include an up round-trip time (URTT) and a down round-trip time (DRTT). The packet loss rate may include an up packet loss rate (UPLR) and a down packet loss rate (DPLR). Specifically, the network key performance indicator may be collected by using a data collection apparatus deployed in or connected in bypass mode to one or more data transmission devices. For example, the data stream may be a TCP data stream, the data collection apparatus may obtain, in diversion or mirroring mode, the TCP data stream received by the corresponding data transmission device, and obtain the round-trip time based on the time label of the TCP data stream. Alternatively, the packet loss rate may be obtained based on a sequence number of a TCP packet in the TCP data stream, or the TCP packet in the TCP data stream may be parsed to obtain the maximum segment size.

In an example, sampling the network key performance indicator may be specifically implemented by calculating an average value of the network key performance indicators in each sampling period divided based on the duration of the sampling period corresponding to the sampling frequency, or by selecting a median value of the network key performance indicators in each sampling period divided based on the duration of the sampling period corresponding to the sampling frequency, where the average value or the median value is used as the network key performance indicator of each sampling period obtained through sampling. The duration of the sampling period corresponds to the sampling frequency, for example, the sampling frequency is 1/30 Hz, and the duration of the sampling period is 30 s.

Each experience quality sequence corresponds to a specific sampling frequency of a specific to-be-analyzed video data stream. The experience quality sequence corresponding to each sampling frequency includes experience quality elements of sampling periods arranged in an order of time. The experience quality element of each sampling period is used to represent the experience quality determined based on the network key performance indicator in the sampling period. The experience quality element may be denoted as a digit, a letter, an equation, a character string including a digit and a letter, or the like. Whether the experience quality is good or poor may be determined based on the network key performance indicator of the to-be-analyzed data stream. For example, if the experience quality elements in the experience quality sequence may be denoted as 0 and 1, where 0 indicates poor experience quality, and 1 indicates good experience quality. The sampling frequencies include two sampling frequencies: 1/30 Hz and 1/60 Hz. For a data stream with duration of five minutes, the network key performance indicator of the data stream is sampled based on the two sampling frequencies. When the sampling frequency is 1/30 Hz, an experience quality sequence [1, 1, 1, 1, 0, 0, 1, 1, 1, 1] corresponding to 1/30 Hz may be obtained. The experience quality elements in ten sampling periods are respectively 1, 1, 1, 1, 0, 0, 1, 1, 1, and 1 arranged in an order of time. In this case, of the network key performance indicators obtained through sampling based on 1/30 Hz, the network key performance indicators obtained through sampling in a fifth sampling period and a sixth sampling period indicate that the experience quality of the data stream in the fifth sampling period and the sixth sampling period is poor. When the sampling frequency is 1/60 Hz, an experience quality sequence [1, 1, 1, 0, 1] corresponding to 1/60 Hz may be obtained. In this case, of the network key performance indicators obtained through sampling based on 1/60 Hz, the network key performance indicator obtained in a fourth sampling period indicates that the experience quality of the data stream in the fourth sampling period is poor.

It should be noted that, in this embodiment of the present disclosure, the duration of the sampling period is a reciprocal of the sampling frequency, and the sampling period is a period of time between two adjacent sampling moments when the network key performance indicator of the data stream is sampled based on the sampling frequency. For example, the sampling frequency is 1/30 Hz, and the duration of the sampling period is 30 s. The network key performance indicator of the video data stream with duration of 10 minutes is sampled based on the sampling frequency of 1/30 Hz. In this case, the video data stream includes 20 sampling periods with duration of 30 s. Sampling the network key performance indicator of the video data stream may yield 20 pieces of sampled data respectively corresponding to the sampling periods. Each piece of sampled data may be specifically a statistical value of the network key performance indicators in the corresponding sampling period, such as a median value or an average value. Correspondingly, 20 experience quality elements of the experience quality sequence corresponding to the sampling frequency are obtained, and are respectively the experience quality elements of all the sampling periods.

In operation 203, a matching degree between the experience quality sequence corresponding to each to-be-tested sampling frequency and the standard experience quality sequence is determined, and a recommended sampling frequency is determined based on the matching degree between the experience quality sequence corresponding to each to-be-tested sampling frequency and the standard experience quality sequence.

The standard experience quality sequence is the experience quality sequence corresponding to a standard sampling frequency. Compared with other sampling frequencies in a plurality of different sampling frequencies, the standard sampling frequency is higher than the other sampling frequencies, and the network key performance indicator obtained through sampling based on the standard sampling frequency is closest to an actual network status. In an example, a relatively high sampling frequency may be preset as the standard sampling frequency, and then a to-be-tested sampling frequency less than the standard sampling frequency is set. In another example, a group of sampling frequencies may be set first, and a maximum sampling frequency in the group of sampling frequencies is used as the standard sampling frequency.

Because the standard experience quality sequence is an experience quality sequence that represents actual network experience quality as exactly as possible, the matching degree with the standard experience quality sequence may be used to represent accuracy of detecting and identifying the network experience quality and a network failure. A higher matching degree leads to higher accuracy of detecting and identifying the network experience quality. The network failure herein is a network problem such as lag that may be obtained by analyzing the network key performance indicator. In an example, the matching degree may be quantified as a similarity degree between the standard experience quality sequence and the experience quality sequence corresponding to the to-be-tested sampling frequency. In other words, the similarity degree between the experience quality elements in the standard experience quality sequence and the experience quality elements in the experience quality sequence corresponding to the to-be-tested sampling frequency may be used as the matching degree. For example, the experience quality sequence corresponding to the to-be-tested sampling frequency and the standard experience quality sequence each include k experience quality elements. Based on a location of each experience quality element in the experience quality sequence corresponding to the to-be-tested sampling frequency and a location of the experience quality element in the standard experience quality sequence, the experience quality elements having a same location in the experience quality sequence corresponding to the to-be-tested sampling frequency and in the standard experience quality sequence are compared one by one. Of k pairs of experience quality elements, p pairs of experience quality elements are the same. In this case, the matching degree between the experience quality sequence corresponding to the to-be-tested sampling frequency and the standard experience quality sequence is p/k, where p is an integer, and k is a positive integer. It should be noted that if the location of the experience quality element in the experience quality sequence is the same as the location of the experience quality element in the standard experience quality sequence, it indicates that the two experience quality elements correspond to a same sampling period.

The recommended sampling frequency may be determined based on the matching degree, and the matching degree corresponding to the recommended sampling frequency meets an expected condition. The expected condition may be set based on a working scenario and a working requirement. Because the standard experience quality sequence is an experience quality sequence that represents actual network experience quality as exactly as possible, the standard experience quality sequence may be used as a criterion, and the matching degree between the experience quality sequence corresponding to the to-be-tested sampling frequency and the standard experience quality sequence may be considered as the accuracy of identifying the network experience quality and the network failure.

For example, under a current network condition, the accuracy of detecting and identifying the network experience quality and the network failure needs to reach approximately 80%. In this case, a to-be-tested sampling frequency corresponding to the experience quality sequence whose matching degree is closest to 80% may be searched for, and the to-be-tested sampling frequency is used as the recommended sampling frequency.

For another example, a to-be-tested sampling frequency with a minimum matching degree is selected from to-be-testedmatching degrees that are greater than 80% as the recommended sampling frequency.

In a scenario in which there are a plurality of to-be-analyzed data streams, for each to-be-tested sampling frequency, matching degrees between experience quality sequences of a plurality of the to-be-analyzed data streams corresponding to the to-be-tested sampling frequency and the standard experience quality sequence are calculated. When the network key performance indicators of a plurality of data streams are sampled by using different to-be-tested sampling frequencies, a plurality of matching degrees may be obtained based on the network key performance indicators obtained through sampling.

In an implementation, for each to-be-tested sampling frequency, a statistical value (for example, an average value or a median value) of a matching degree between an experience quality sequence of each to-be-analyzed data stream corresponding to the to-be-tested sampling frequency and the standard experience quality sequence may be calculated. A minimum sampling frequency in the to-be-tested sampling frequencies whose statistical values of the matching degree fall within an expected matching degree range is used as the recommended sampling frequency.

In another implementation, for each to-be-analyzed data stream, a minimum sampling frequency in the to-be-tested sampling frequencies whose matching degrees fall within an expected matching degree range is selected, and a most frequently selected to-be-tested sampling frequency is used as the recommended sampling frequency. In other words, that the matching degree meets the expected condition may specifically mean that the matching degree most frequently meets the following condition: a minimum sampling frequency in the to-be-tested sampling frequencies whose matching degrees fall within an expected matching degree range. For example, the KPIs of three to-be-analyzed data streams are sampled by using the standard sampling frequency (for example, $1/30$ Hz) and three to-be-tested sampling frequencies (for example, $1/60$ Hz, $1/120$ Hz, and $1/180$ Hz). For a to-be-analyzed data stream 1, the to-be-tested sampling frequencies whose matching degrees are greater than 80% are $1/60$ Hz and $1/120$ Hz (that is, a minimum to-be-tested sampling frequency in the to-be-tested sampling frequencies whose matching degrees are greater than 80% is $1/120$ Hz). For a to-be-analyzed data stream 2, the to-be-tested sampling frequencies whose matching degrees are greater than 80% are also $1/60$ Hz and $1/120$ Hz. For a to-be-analyzed data stream 3, the to-be-tested sampling frequency whose matching degree is greater than 80% is only $1/60$ Hz (that is, a minimum to-be-tested sampling frequency in the to-be-tested sampling frequencies whose matching degrees are greater than 80% is $1/60$ Hz). In this case, the determined recommended sampling frequency is $1/120$ Hz.

In subsequent actual network monitoring, a data analysis server may use the recommended sampling frequency to sample the network key performance indicator of the to-be-analyzed data stream collected by the data transmission device. Alternatively, the data analysis server may deliver the obtained recommended sampling frequency to the data transmission device that is configured to sample the network key performance indicator. The data transmission device that is configured to sample the network key performance indicator collects the network key performance indicator of the to-be-analyzed data stream based on the recommended sampling frequency, and then summarizes and reports, to the data analysis server, the network key performance indicator of the to-be-analyzed data stream collected based on the recommended sampling frequency.

In this embodiment of the present disclosure, the standard experience quality sequence can reflect the network experience quality of a network as far as possible. The matching degree may represent the similarity degree between the standard experience quality sequence and the experience quality sequence corresponding to the to-be-tested sampling frequency. In other words, the matching degree may represent the accuracy of identifying the network experience quality. The matching degree that meets a requirement may be obtained by using the expected condition, and then the recommended sampling frequency corresponding to the matching degree that meets the requirement is obtained. Therefore, the recommended sampling frequency is used to make a balance between a network experience quality identification capability and network performance.

Figure 3:
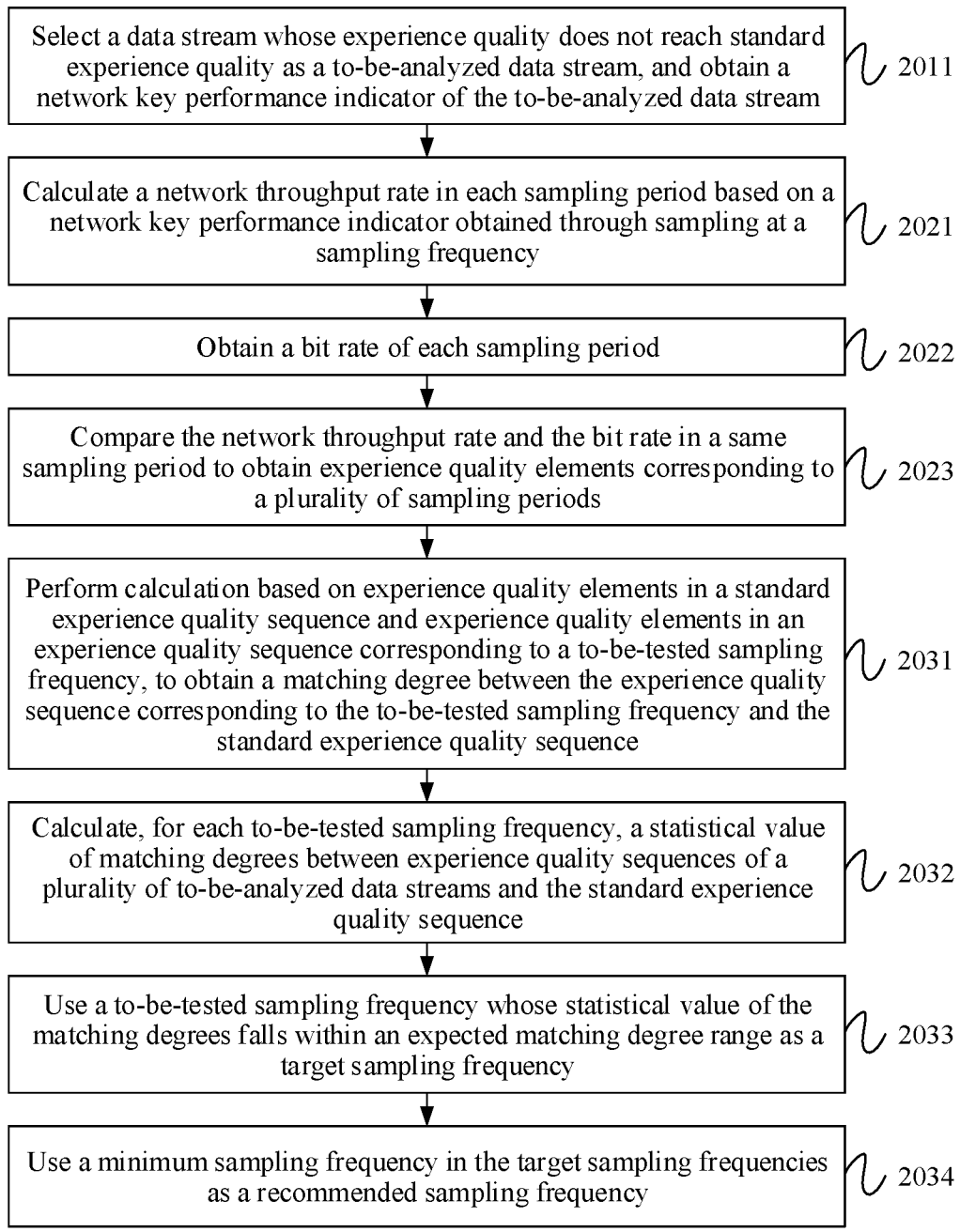
FIG. 3 is a flowchart of a sampling frequency recommendation method according to another embodiment of the present disclosure.

FIG. 3 is a flowchart of a sampling frequency recommendation method according to another embodiment of the present disclosure. FIG. 3 is a specific implementation of the sampling frequency recommendation method shown in FIG. 2. Operation 201 in FIG. 2 may be detailed as operation 2011 in FIG. 3. Operation 202 in FIG. 2 may be detailed as operation 2021 to operation 2023 in FIG. 3. Operation 203 in FIG. 2 may be detailed as operation 2031 to operation 2034 in FIG. 3.

In operation 2011, a data stream whose experience quality does not reach standard experience quality is selected as a to-be-analyzed data stream, and a network key performance indicator of the to-be-analyzed data stream is obtained.

To improve a speed and efficiency of obtaining a recommended sampling frequency, a data stream may be screened first (for example, the data stream is screened based on experience data of the data stream), and a data stream with poor experience quality is used as the to-be-analyzed data stream. The standard experience quality is experience quality delimitation for distinguishing between good experience quality and poor experience quality. If the experience quality does not reach the standard experience quality, it indicates that the experience quality is poor, and if the experience quality reaches the standard experience quality, it indicates that the experience quality is good. For example, the data stream is a video data stream, and the experience quality may be a lag time ratio. Whether lag occurs may be used to distinguish between good experience quality and poor experience quality, and the lag time ratio of 0 is the standard experience quality. If the lag time ratio is not 0, it indicates that lag occurs, the experience quality does not reach the standard experience quality, and the video data stream whose lag time ratio is not 0 may be used as the to-be-analyzed video data stream. The standard experience quality may also be adjusted and set based on a working scenario and a working requirement. For example, the data stream is a video data stream, and the experience quality may be a lag time ratio. Whether lag is serious may be used to distinguish between good experience quality and poor experience quality, and the lag time ratio less than or equal to 30% is the standard experience quality. In this case, if the lag time ratio is greater than 30%, it indicates that lag is serious, the experience quality does not reach the standard experience quality, and the video data stream whose lag time ratio is greater than 30% may be used as the to-be-analyzed video data stream.

In an example, the experience data of the data stream may be collected by a service inspection gateway. The key performance indicator of the to-be-analyzed video data stream may be collected by a data collection apparatus deployed in a data transmission device. While collecting the network key performance indicator, the data transmission device may also obtain a data stream identifier of the data stream. The service inspection gateway uploads the collected experience data of the data stream to the quality monitoring center. The experience data of the data stream includes the data stream identifier of the data stream. Cooperating with a data analysis server, the quality monitoring center may associate the to-be-analyzed data stream with the network key performance indicator of the to-be-analyzed data stream by using the data stream identifier in the experience data of the data stream.

In operation 2021, a network throughput rate in each sampling period is calculated based on the network key performance indicator obtained through sampling at the sampling frequency.

For any to-be-analyzed data stream, network key performance indicators obtained through sampling at different sampling frequencies may be different. In other words, for one or more to-be-analyzed data streams, network throughput rates obtained through calculation based on the network key performance indicators obtained through sampling at different sampling frequencies may also be different. In an embodiment, the network key performance indicators include a round-trip time, a packet loss rate, and a maximum segment size. The network throughput rate in each sampling period may be obtained through calculation by using calculation formulas (1) to (4), and the calculation formula (1) is as follows:

$$\text{Throughput} = \frac{1.22 Mss}{Rtt\sqrt{Plr}} \quad (1)$$

$$T(U) = \frac{1.22 Mss}{(URtt + DRtt)\sqrt{UPlr}} \quad (2)$$

$$T(D) = \frac{1.22 Mss}{(URtt + DRtt)\sqrt{DPlr}} \quad (3)$$

-continued $$T(U+D) = \frac{1.22 Mss}{(URtt + DRtt)\sqrt{(UPlr + DPlr)}} \quad (4)$$

Throughput represents a network throughput rate in one sampling period, Mss represents a maximum segment size in one sampling period, Rtt represents a round-trip time in one sampling period, and Plr represents a packet loss rate in one sampling period. T(U) represents a maximum throughput rate that may be supported by a network upstream in one sampling period, URtt represents an up round-trip time in one sampling period, DRtt represents a down round-trip time in one sampling period, and UPlr represents an up packet loss rate in one sampling period. T(U) represents a maximum throughput rate that may be supported by a network downstream, and DPlr represents a down packet loss rate in one sampling period. T(U+D) represents a maximum throughput rate that may be supported by a network upstream and a network downstream. The foregoing calculation formulas may be selected based on a specific requirement for network monitoring.

It should be noted that the network key performance indicator in one sampling period may be an average value of network key performance indicators at a plurality of different moments in one sampling period, or may be a median value of network key performance indicators at a plurality of different moments in one sampling period. For example, in one sampling period, the data transmission device collects the round-trip time at a plurality of different moments that is used to calculate the round-trip time in one sampling period for the network throughput rate in one sampling period. The round-trip time may be an average value of round-trip times at a plurality of different moments in the sampling period, or may be a median value of round-trip time at a plurality of different moments in the sampling period.

In operation 2022, a bit rate of each sampling period is obtained.

When the network key performance indicator of the to-be-analyzed data stream is collected, the bit rate of the to-be-analyzed data stream may also be collected. For example, the data stream is a video data stream, and the bit rate is a video bit rate. The video bit rate may be obtained by parsing a packet of the video data stream by using a deep packet inspection (DPI) technology. Correspondingly, in operation 2022, a collected bit rate may be sampled based on the sampling frequency to obtain the bit rate of each sampling period.

In operation 2023, the network throughput rate and the bit rate in the same sampling period are compared to obtain experience quality elements corresponding to a plurality of sampling periods.

Each sampling period corresponds to one experience quality element, and the experience quality element includes a good quality state or a poor quality state. The good quality state represents that the network throughput rate is greater than or equal to the bit rate in the same sampling period, and the poor quality state represents that the network throughput rate is less than the bit rate in the same sampling period.

When the network throughput rate is less than the bit rate in the same sampling period, it indicates that lag may occur in the sampling period, and network experience quality is poor. The poor quality state may further include a plurality of states, for example, the poor quality state may further include a slightly poor quality state or a seriously poor quality state. Specifically, a difference between the bit rate and the network throughput rate in a sampling period may be calculated. If the difference is greater than or equal to a poor quality state determining threshold, the poor quality state is determined as the slightly poor quality state. If the difference is less than the poor quality state determining threshold, the poor quality state is determined as the seriously poor quality state. The poor quality state determining threshold is a delimitation threshold for distinguishing between the slightly poor quality state and the seriously poor quality state, and may be set based on a working scenario and a working requirement.

In an example, for ease of recording and calculation, the experience quality element may be stored and recorded by using a binarization method. The experience quality element may constitute an experience quality sequence. The experience quality sequence includes experience quality elements of sampling periods arranged in an order of time. For example, the good quality state is denoted by 1, and the poor quality state is denoted by 0. If sampling is performed at a to-be-tested sampling frequency of 1/60 Hz within five minutes, experience quality elements corresponding to a first sampling period, a second sampling period, a third sampling period, a fourth sampling period, and a fifth sampling period are respectively a good quality state, a good quality state, a good quality state, a poor quality state, and a good quality state, and an experience quality sequence may be [1, 1, 1, 0, 1].

Specifically, the experience quality sequence may be binarized by using calculation formulas (5) to (7):

$$F(T_{sample}) = [f(T_1), f(T_2), \ldots, f(T_i), \ldots, f(T_n)] \quad (5)$$

$$f(T_i) = 0, rate_i > Throughput_i \quad (6)$$

$$f(T_i) = 1, rate_i \leq Throughput_i \quad (7)$$

$F(T_{sample})$ represents an experience quality sequence at a current to-be-tested sampling frequency, $f(T_i)$ represents an experience quality element corresponding to an $i^{th}$ sampling period, $rate_i$ represents a bit rate of the $i^{th}$ sampling period, and $Throughput_i$ represents a network throughput rate of the $i^{th}$ sampling period.

Usually, when a data stream is transmitted by using a reliable transmission protocol (such as TCP), the experience quality element of each sampling period is determined by using a size relationship between the network throughput rate and the bit rate based on an implementation in operation 2021 to operation 2023.

Operation 2021 to operation 2023 are operations performed for each sampling frequency.

In operation 2031, based on the experience quality elements in the standard experience quality sequence and the experience quality elements in the experience quality sequence corresponding to the to-be-tested sampling frequency, a matching degree between the experience quality sequence corresponding to the to-be-tested sampling frequency and the standard experience quality sequence is obtained through calculation.

The standard experience quality sequence corresponds to a standard sampling frequency. Because a higher sampling frequency indicates that the network key performance indicator obtained through sampling by using the sampling frequency can reflect an actual network status more exactly, accuracy of detecting and identifying network experience quality and a network failure is higher. Therefore, a sampling frequency with a maximum sampling frequency value in a plurality of sampling frequencies may be selected as the standard sampling frequency. For example, the plurality of sampling frequencies include 1/30 Hz, 1/60 Hz, 1/120 Hz, 1/180 Hz, and 1/300 Hz, and 1/30 Hz may be selected as the standard sampling frequency.

In operation 2032, for each to-be-tested sampling frequency, a statistical value of matching degrees between experience quality sequences of a plurality of to-be-analyzed data streams corresponding to the to-be-tested sampling frequency and the standard experience quality sequence is calculated.

The statistical value may include an average value or a median value. In other words, if a plurality of to-be-analyzed data streams in a network are monitored, for each to-be-tested sampling frequency, the average value of the matching degrees or the median value of the matching degrees between the experience quality sequences of the plurality of to-be-analyzed data streams in the network and the standard experience quality sequence is calculated. The statistical value of the matching degrees between the experience quality sequences of the plurality of to-be-analyzed data streams and the standard experience quality sequence is used as the matching degree corresponding to the to-be-tested sampling frequency.

Because the to-be-tested sampling frequency is different from the standard sampling frequency, a quantity of experience quality elements in the standard experience quality sequence is different from a quantity of experience quality elements in the experience quality sequence corresponding to the to-be-tested sampling frequency. In addition, the standard sampling frequency corresponding to the standard experience quality sequence is higher than another to-be-tested sampling frequency. In other words, the quantity of experience quality elements in the standard experience quality sequence is larger than the quantity of experience quality elements in the experience quality sequence corresponding to the sampling frequency. In this case, the experience quality elements in the standard experience quality sequence need to be combined, and the matching degree is calculated by using the combined experience quality elements in the standard experience quality sequence and the experience quality elements in the experience quality sequence corresponding to the to-be-tested sampling frequency.

In an example, a quantity of experience quality elements in the standard experience quality sequence is N, a quantity of experience quality elements in the experience quality sequence corresponding to the to-be-tested sampling frequency is M, and both N and M are positive integers. Every N/M consecutive experience quality elements in the standard experience quality sequence are combined into one experience quality element, where N/M is also a positive integer. A proportion of a quantity of target experience quality elements in the experience quality elements in the experience quality corresponding to the to-be-tested sampling frequency is calculated, and the proportion is used as the matching degree between the experience quality sequence corresponding to the sampling frequency and the standard experience quality sequence. The target experience quality element is an experience quality element that is in the experience quality sequence corresponding to the to-be-tested sampling frequency and that is the same as an experience quality element of a corresponding sampling period in the standard experience quality sequence obtained after combination of the experience quality elements. When the experience quality elements are combined, in the standard experience quality sequence, if at least one of every N/M consecutive experience quality elements is in a poor quality state, the experience quality element obtained after combination of the N/M consecutive experience quality elements is in the poor quality state. If each experience quality element in every N/M consecutive experience quality elements is in a good quality state, the experience quality element obtained after combination of the N/M consecutive experience quality elements is in the good quality state.

For example, the standard sampling frequency is 1/30 Hz, and the standard experience quality sequence is [1, 1, 0, 1, 1, 1, 1, 0, 0, 1, 1, 1, 0, 1, 0, 1, 1, 1, 1, 0, 1, 1, 1, 1, 1, 0, 1, 0, 1, 1]. The to-be-tested sampling frequency is 1/90 Hz, and the experience quality sequence corresponding to the sampling frequency is [0, 1, 1, 1, 0, 1, 1, 1, 0, 0]. In this case, every three experience quality elements in the standard experience quality sequence are combined into one experience quality element, and the standard experience quality sequence obtained after combination of the experience quality elements is [0, 1, 0, 1, 0, 1, 0, 1, 0, 0]. It may be learned that the experience quality sequence corresponding to the to-be-tested sampling frequency differs from the standard experience quality sequence obtained after combination of the experience quality elements in a third experience quality element and a seventh experience quality element. To be specific, a quantity of the target experience quality elements is 8, and a quantity of all elements in the to-be-tested sampling frequency is 10. In this case, the matching degree between the experience quality sequence corresponding to the to-be-tested sampling frequency and the standard experience quality sequence is 8/10=80%.

In operation 2033, a to-be-tested sampling frequency whose statistical value of the matching degrees falls within an expected matching degree range is used as a target sampling frequency.

With reference to the working scenario and the working requirement, the expected matching degree range may be preset, and the expected matching degree range may be one of expected conditions. Because matching degrees corresponding to different to-be-tested sampling frequencies may fall within or outside the expected matching degree range, the matching degree may be selected within the expected matching degree range, to obtain the target sampling frequency. The target sampling frequency is a candidate sampling frequency of the recommended sampling frequency.

In operation 2034, a minimum sampling frequency in the target sampling frequencies is used as the recommended sampling frequency.

To minimize a performance requirement of a network device and avoid a waste of resources in addition to meeting an expected target, a minimum target sampling frequency may be selected as the recommended sampling frequency. For example, the standard sampling frequency is 1/30 Hz, the to-be-tested sampling frequencies include 1/60 Hz, 1/90 Hz, 1/120 Hz, 1/150 Hz, 1/180 Hz, and 1/300 Hz, and the statistical values of the matching degrees between the experience quality sequence corresponding to each to-be-tested sampling frequency and the standard experience quality sequence are respectively 88.41%, 82.19%, 80.58%, 68.42%, 65.03%, and 57.69%. If the expected matching degree range is greater than 80%, the target sampling frequencies include 1/60 Hz, 1/90 Hz, and 1/120 Hz. The minimum frequency value 1/120 Hz is selected as the recommended sampling frequency.

Figure 4:
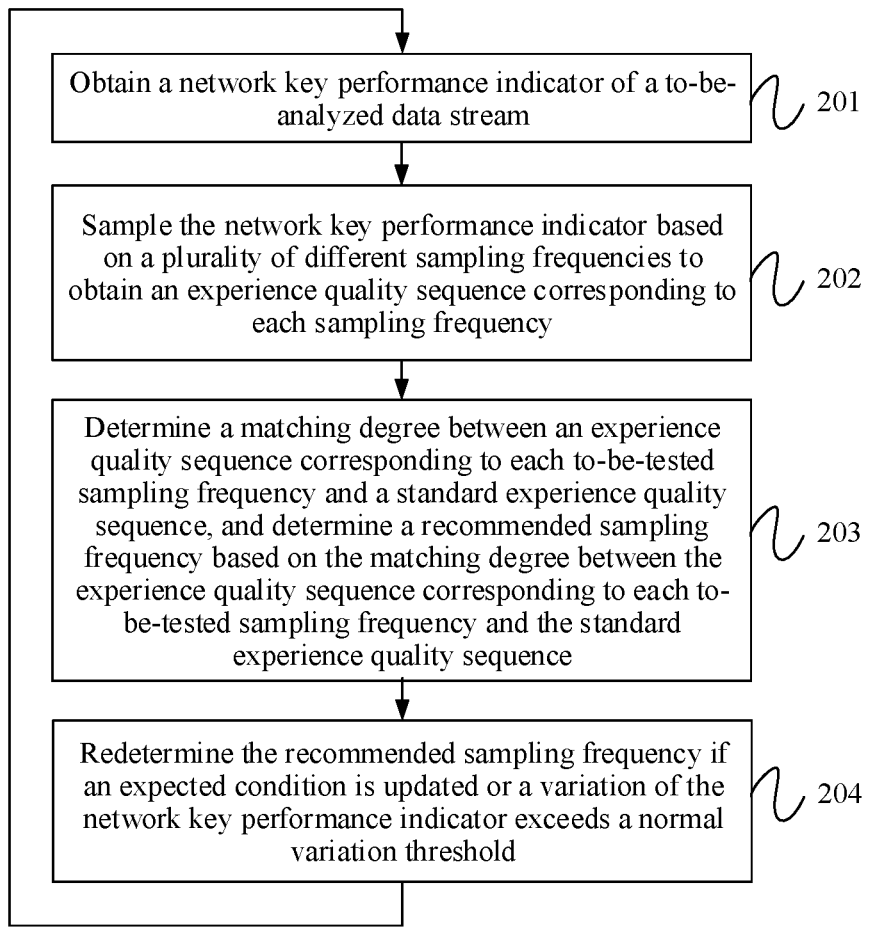
FIG. 4 is a flowchart of a sampling frequency recommendation method according to still another embodiment of the present disclosure.

FIG. 4 is a flowchart of a sampling frequency recommendation method according to still another embodiment of the present disclosure. The difference between FIG. 4 and FIG. 2 lies in that the sampling frequency recommendation method in FIG. 4 further includes operation 204.

In operation 204, a recommended sampling frequency is redetermined if an expected condition is updated or a variation of a network key performance indicator exceeds a normal variation threshold.

In an example, when the expected condition is updated, to be specific, an accuracy requirement for detecting and identifying network experience quality and a network failure is changed significantly, for example, when an accuracy requirement for identifying a network failure is greatly increased or decreased, original accuracy for identifying a network failure for the network is no longer applicable to a current network, and a recommended sampling frequency suitable for the current network needs to be re-obtained based on the sampling frequency recommendation method in the foregoing embodiment.

In an example, when the variation of the network key performance indicator exceeds the normal variation threshold, that is, a network status changes significantly, for example, when network performance is greatly optimized or degraded, original accuracy for detecting and identifying network experience quality and a network failure for the network is no longer applicable to the current network, and a recommended sampling frequency suitable for the current network needs to be re-obtained based on the sampling frequency recommendation method in the foregoing embodiment.

In other words, adaptive update and adaptive optimization recommended by the sampling frequency may be implemented based on a latest network key performance indicator, thereby maintaining optimal network performance.

Figure 5:
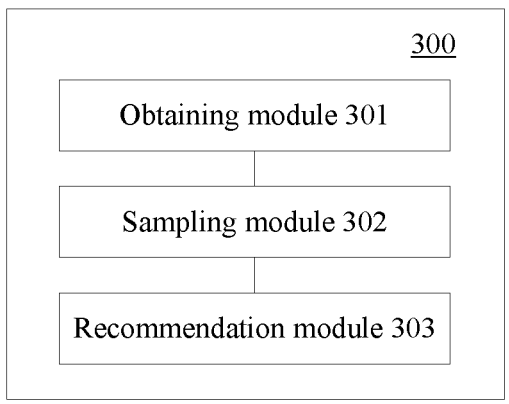
FIG. 5 is a schematic structural diagram of a sampling frequency recommendation apparatus according to an embodiment of the present disclosure.

FIG. 5 is a schematic structural diagram of a sampling frequency recommendation apparatus 300 according to an embodiment of the present disclosure. As shown in FIG. 5, the sampling frequency recommendation apparatus 300 may include an obtaining module 301, a sampling module 302, and a recommendation module 303.

The obtaining module 301 is configured to obtain a network key performance indicator of a to-be-analyzed data stream.

For description of the obtaining module 301, refer to related description in operation 201 in the foregoing embodiment.

The sampling module 302 is configured to sample the network key performance indicator based on a plurality of different sampling frequencies to obtain an experience quality sequence corresponding to each sampling frequency. The plurality of different sampling frequencies include one standard sampling frequency and at least two to-be-tested sampling frequencies, and the standard sampling frequency is greater than each to-be-tested sampling frequency. The experience quality sequence corresponding to each sampling frequency includes experience quality elements of sampling periods arranged in an order of time, and the experience quality element of each sampling period is used to represent experience quality determined based on the network key performance indicator in the sampling period, and duration of the sampling period corresponds to the sampling frequency.

For description of the sampling module 302, refer to related description in operation 202 in the foregoing embodiment.

The recommendation module 303 is configured to: determine a matching degree between an experience quality sequence corresponding to each to-be-tested sampling frequency and a standard experience quality sequence, and determine a recommended sampling frequency based on the matching degree between the experience quality sequence corresponding to each to-be-tested sampling frequency and the standard experience quality sequence, where the matching degree corresponding to the recommended sampling frequency meets an expected condition, and the standard experience quality sequence corresponds to the standard sampling frequency.

For description of the recommendation module 303, refer to related description in operation 203 in the foregoing embodiment.

In this embodiment of the present disclosure, the standard experience quality sequence can reflect the network experience quality of a network as far as possible. The matching degree may represent the similarity degree between the standard experience quality sequence and the experience quality sequence corresponding to the to-be-tested sampling frequency. In other words, the matching degree may represent the accuracy of identifying the network experience quality. The matching degree that meets a requirement may be obtained by using the expected condition, and then the recommended sampling frequency corresponding to the matching degree that meets the requirement is obtained. Therefore, the recommended sampling frequency is used to make a balance between a network experience quality identification capability and network performance.

In another implementation of this embodiment of the present disclosure, the sampling module 302 may be specifically configured to: calculate, for each of the sampling frequencies, a network throughput rate in each sampling period based on a network key performance indicator obtained through sampling at the sampling frequency, obtain a bit rate of each sampling period, and compare the network throughput rate and the bit rate in the same sampling period, to obtain experience quality elements corresponding to a plurality of sampling periods, where the experience quality element includes a good quality state or a poor quality state, the good quality state represents that the network throughput rate is greater than or equal to the bit rate in the same sampling period, and the poor quality state represents that the network throughput rate is less than the bit rate in the same sampling period.

For related description of the sampling module 302, refer to related description in operation 2021 to operation 2023.

When determining the matching degree between the experience quality sequence corresponding to the to-be-tested sampling frequency and the standard experience quality sequence, the recommendation module 303 may be specifically configured to perform calculation based on the experience quality elements in the standard experience quality sequence and the experience quality elements in the experience quality sequence corresponding to the to-be-tested sampling frequency, to obtain the matching degree between the experience quality sequence corresponding to the to-be-tested sampling frequency and the standard experience quality sequence.

For description of the recommendation module 302, refer to related description in operation 2031 in the foregoing embodiment.

In an example, a quantity of experience quality elements in the standard experience quality sequence is N, a quantity of experience quality elements in the experience quality sequence corresponding to the to-be-tested sampling frequency is M, and both N and M are positive integers. When performing calculation based on the experience quality elements in the standard experience quality sequence and the experience quality elements in the experience quality sequence corresponding to the to-be-tested sampling frequency, to obtain the matching degree between the experience quality sequence corresponding to the to-be-tested sampling frequency and the standard experience quality sequence, the recommendation module 303 may be specifically configured to: combine every N/M consecutive experience quality elements in the standard experience quality sequence into one experience quality element, where N/M is a positive integer; calculate a proportion of a quantity of target experience quality elements in a quantity of the experience quality elements in the experience quality sequence corresponding to the to-be-tested sampling frequency, and use the proportion as the matching degree between the experience quality sequence corresponding to the to-be-tested sampling frequency and the standard experience quality sequence, where the target experience quality element is an experience quality element that is in the experience quality sequence corresponding to the to-be-tested sampling frequency and that is the same as an experience quality element of a corresponding sampling period in the standard experience quality sequence obtained after combination of the experience quality elements.

In the standard experience quality sequence, if at least one of every N/M consecutive experience quality elements is in a poor quality state, the experience quality element obtained after combination of the N/M consecutive experience quality elements is in the poor quality state.

For a specific function performed by the recommendation module 303, refer to related description of operation 2032 in the foregoing embodiment.

When determining the recommended sampling frequency based on the matching degree between the experience quality sequence corresponding to each of the to-be-tested sampling frequencies and the standard experience quality sequence, the recommendation module 303 may be specifically configured to: calculate, for each to-be-tested sampling frequency, a statistical value of matching degrees between experience quality sequences of a plurality of to-be-analyzed data streams corresponding to the to-be-tested sampling frequency and the standard experience quality sequence, where the statistical value includes an average value or a median value; use a to-be-tested sampling frequency whose statistical value of the matching degrees falls within an expected matching degree range as a target sampling frequency; and use a minimum sampling frequency in the target sampling frequencies as the recommended sampling frequency.

For description of the recommendation module 303, refer to related description in operation 2032 to operation 2034 in the foregoing embodiment.

In an example, the obtaining module 301 in the foregoing embodiment is specifically configured to: select a data stream whose experience quality does not reach the standard experience quality as the to-be-analyzed data stream, and obtain the network key performance indicator of the to-be-analyzed data stream.

For description of the obtaining module 301, refer to related description in operation 2011 in the foregoing embodiment.

In an example, when determining the recommended sampling frequency based on the matching degree between the experience quality sequence corresponding to each of the to-be-tested sampling frequencies and the standard experience quality sequence, the recommendation module 303 may be specifically configured to: calculate, for each of the to-be-tested sampling frequencies, matching degrees between experience quality sequences of a plurality of the to-be-analyzed data streams corresponding to the to-be-tested sampling frequency and the standard experience quality sequence; and select, for each to-be-analyzed data stream, a minimum sampling frequency from the to-be-tested sampling frequencies whose matching degrees fall within an expected matching degree range, and use a most frequently selected to-be-tested sampling frequency as the recommended sampling frequency.

For description of the recommendation module 303, refer to related description in operation 203 in the foregoing embodiment.

Figure 6:
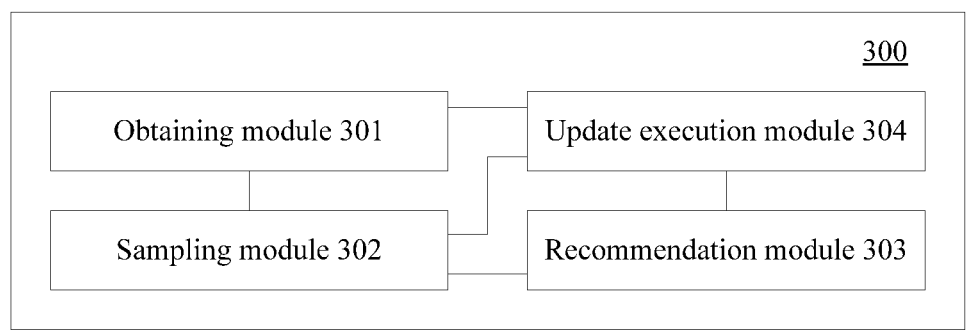
FIG. 6 is a schematic structural diagram of a sampling frequency recommendation apparatus according to another embodiment of the present disclosure.

FIG. 6 is a schematic structural diagram of a sampling frequency recommendation apparatus 300 according to another embodiment of the present disclosure. The difference between FIG. 6 and FIG. 5 lies in that the sampling recommendation apparatus 300 shown in FIG. 6 may further include an update execution module 304.

The update execution module 304 is configured to: if the expected condition is updated or a variation of the network key performance indicator exceeds a normal variation threshold, trigger the obtaining module 301, the sampling module 302, and the recommendation module 303 to redetermine the recommended sampling frequency.

For description of re-obtaining the recommended sampling frequency by the update execution module 304, refer to related description in operation 204 in the foregoing embodiment.

In this embodiment of the present disclosure, adaptive update and adaptive optimization recommended by the sampling frequency may be implemented based on a latest network key performance indicator, thereby maintaining optimal network performance.

Figure 7:
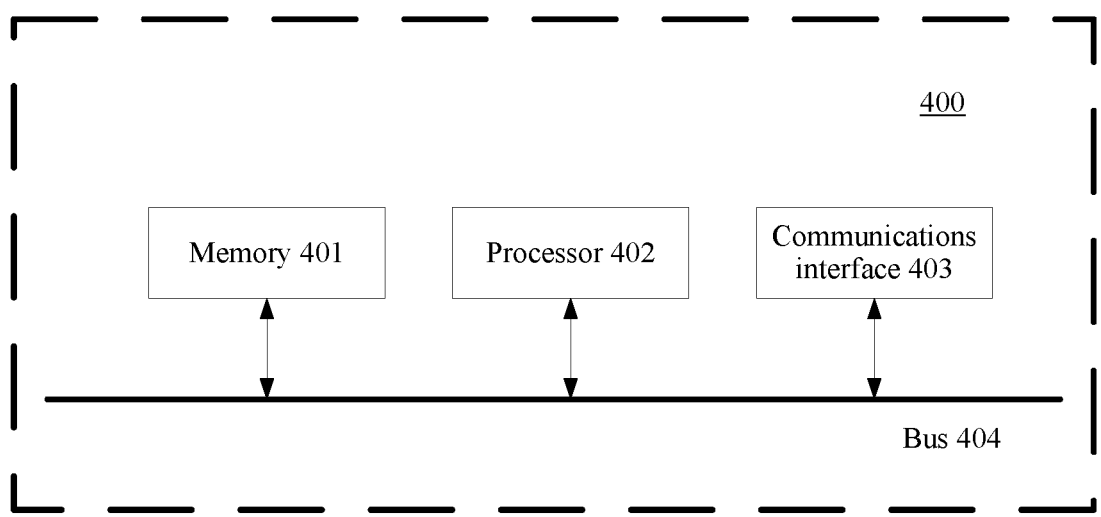
FIG. 7 is a schematic diagram of a hardware structure of a sampling frequency recommendation device according to an embodiment of the present disclosure.

The sampling frequency recommendation method and apparatus in the embodiments of the present disclosure described with reference to FIG. 1 to FIG. 6 may be implemented by a sampling frequency recommendation device 400. FIG. 7 is a schematic diagram of a hardware structure of a sampling frequency recommendation device 400 according to an embodiment of the present disclosure.

The sampling frequency recommendation device 400 includes a memory 401, a processor 402, and a computer program that is stored in the memory 401 and that is executable on the processor 402.

In an example, the processor 402 may include a central processing unit (CPU), or an application-specific integrated circuit (ASIC), or may be configured as one or more integrated circuits that implement the embodiments of the present disclosure.

The memory 401 may include a mass memory used for data or an instruction. By way of example without limitation, the memory 401 may include a hard disk drive (HDD), a floppy disk drive, a flash memory, a compact disc, a magneto-optical disc, a magnetic tape, a universal serial bus (USB) drive, or a combination of two or more foregoing components. In an appropriate case, the memory 401 may include a removable, irremovable, or fixed medium. In an appropriate case, the memory 401 may be inside or outside the sampling frequency recommendation device 400. In a specific embodiment, the memory 401 is a non-volatile solid-state memory. In a specific embodiment, the memory 401 includes a read-only memory (ROM). In an appropriate case, the ROM may be a mask programming ROM, a programmable ROM (PROM), an erasable PROM (EPROM), an electrically erasable PROM (EEPROM), an electrically alterable ROM (EAROM), a flash memory, or a combination of two or more foregoing components.

The processor 402 runs a program corresponding to executable program code by reading the executable program code stored in the memory 401, to perform the sampling frequency recommendation method in the foregoing embodiment.

In an example, the sampling frequency recommendation device 400 may further include a communications interface 403 and a bus 404. As shown in FIG. 10, the memory 401, the processor 402, and the communications interface 403 are connected and communicate with each other by using the bus 404.

The communications interface 403 is mainly configured to implement communication between modules, apparatuses, units, and/or devices in the embodiments of the present disclosure. The communications interface 403 may be connected to an input device and/or an output device.

The bus 404 includes hardware, software, or both, and couples the components of the sampling frequency recommendation device 400. By way of example without limitation, the bus 404 may include an accelerated graphics port (AGP) or another graphics bus, an enhanced industry standard architecture (EISA) bus, a front side bus (FSB), a HyperTransport (HT) interconnection, an industry standard architecture (ISA) bus, an infinite bandwidth interconnect, a low pin count (LPC) bus, a memory bus, a microchannel architecture (MCA) bus, a peripheral component interconnect (PCI) bus, a PCI-Express (PCI-X) bus, a serial advanced technology attachment (SATA) bus, a Video Electronics Standards Association local (VLB) bus, another appropriate bus, or a combination of two or more foregoing buses. In an appropriate case, the bus 404 may include one or more buses. Although specific buses are described and shown in the embodiments of the present disclosure, any appropriate bus or interconnection is considered in the present disclosure.

An embodiment of the present disclosure further provides a storage medium, where the storage medium stores a program, and when the program is executed by a processor, the sampling frequency recommendation method in the foregoing embodiment is implemented.

What is claimed is:

1. A sampling frequency recommendation method, comprising:
    obtaining a network key performance indicator of a to-be-analyzed data stream in a network;
    sampling the network key performance indicator over a period of time, the sampling being based on a plurality of different sampling frequencies to obtain an experience quality sequence corresponding to each of the sampling frequencies for the period of time, wherein the plurality of different sampling frequencies comprise one standard sampling frequency and at least two to-be-tested sampling frequencies, the standard sampling frequency is greater than each of the to-be-tested sampling frequencies, the experience quality sequence corresponding to each of the sampling frequencies comprises experience quality elements of sampling periods arranged in an order of time, and the experience quality element of each sampling period is used to represent experience quality determined based on the network key performance indicator in the sampling period;
    determining a matching degree between an experience quality sequence corresponding to each of the to-be-tested sampling frequencies and a standard experience quality sequence, and determining a recommended sampling frequency based on the matching degree between the experience quality sequence corresponding to each of the to-be-tested sampling frequencies and the standard experience quality sequence, wherein the matching degree corresponding to the recommended sampling frequency meets an expected condition, and the standard experience quality sequence corresponds to the standard sampling frequency; and sampling the network at the recommended sampling frequency to detect a failure of the network.

2. The method according to claim 1, wherein the sampling the network key performance indicator based on a plurality of different sampling frequencies to obtain an experience quality sequence corresponding to each of the sampling frequencies comprises:

calculating, for each of the sampling frequencies, a network throughput rate in each sampling period based on a network key performance indicator obtained through sampling at the sampling frequency, obtaining a bit rate of each sampling period, and comparing the network throughput rate and the bit rate in the same sampling period, to obtain experience quality elements corresponding to a plurality of sampling periods, wherein the experience quality element comprises a good quality state or a poor quality state, the good quality state represents that the network throughput rate is greater than or equal to the bit rate in the same sampling period, and the poor quality state represents that the network throughput rate is less than the bit rate in the same sampling period.

3. The method according to claim 1, wherein the determining a matching degree between an experience quality sequence corresponding to the to-be-tested sampling frequency and a standard experience quality sequence comprises:

performing calculation based on the experience quality elements in the standard experience quality sequence and the experience quality elements in the experience quality sequence corresponding to the to-be-tested sampling frequency, to obtain the matching degree between the experience quality sequence corresponding to the to-be-tested sampling frequency and the standard experience quality sequence.

4. The method according to claim 3, wherein a quantity of experience quality elements in the standard experience quality sequence is N, a quantity of experience quality elements in the experience quality sequence corresponding to the to-be-tested sampling frequency is M, and both N and M are positive integers; and the performing calculation based on the experience quality elements in the standard experience quality sequence and the experience quality elements in the experience quality sequence corresponding to the to-be-tested sampling frequency, to obtain the matching degree between the experience quality sequence corresponding to the to-be-tested sampling frequency and the standard experience quality sequence comprises:

combining every N/M consecutive experience quality elements in the standard experience quality sequence into one experience quality element, wherein N/M is a positive integer; and calculating a proportion of a quantity of target experience quality elements in a quantity of experience quality elements in the experience quality sequence corresponding to the to-be-tested sampling frequency, and using the proportion as the matching degree between the experience quality sequence corresponding to the to-be-tested sampling frequency and the standard experience quality sequence, wherein the target experience quality element is an experience quality element that is in the experience quality sequence corresponding to the to-be-tested sampling frequency and that is the same as an experience quality element of a corresponding sampling period in the standard experience quality sequence obtained after combination of the experience quality elements.

5. The method according to claim 4, wherein in the standard experience quality sequence, if at least one of every N/M consecutive experience quality elements is in a poor quality state, the experience quality element obtained by combining the N/M consecutive experience quality elements is in the poor quality state.

6. The method according to claim 1, wherein the determining a recommended sampling frequency based on the matching degree between the experience quality sequence corresponding to each of the to-be-tested sampling frequencies and the standard experience quality sequence comprises:

calculating, for each of the to-be-tested sampling frequencies, a statistical value of matching degrees between experience quality sequences of a plurality of the to-be-analyzed data streams corresponding to the to-be-tested sampling frequency and the standard experience quality sequence, wherein the statistical value comprises an average value or a median value;

using a to-be-tested sampling frequency whose statistical value of the matching degrees falls within an expected matching degree range as a target sampling frequency; and using a minimum sampling frequency in the target sampling frequencies as the recommended sampling frequency.

7. The method according to claim 1, wherein the determining a recommended sampling frequency based on the matching degree between the experience quality sequence corresponding to each of the to-be-tested sampling frequencies and the standard experience quality sequence comprises:

calculating, for each of the to-be-tested sampling frequencies, matching degrees between experience quality sequences of a plurality of the to-be-analyzed data streams corresponding to the to-be-tested sampling frequency and the standard experience quality sequence; and selecting, for each to-be-analyzed data stream, a minimum sampling frequency from the to-be-tested sampling frequencies whose matching degrees fall within an expected matching degree range, and using a most frequently selected to-be-tested sampling frequency as the recommended sampling frequency.

8. The method according to claim 1, wherein the obtaining a network key performance indicator of a to-be-analyzed data stream comprises:

selecting a data stream whose experience quality does not reach standard experience quality as the to-be-analyzed data stream, and obtaining the network key performance indicator of the to-be-analyzed data stream.

9. The method according to claim 1, further comprising:

redetermining the recommended sampling frequency if the expected condition is updated or a variation of the network key performance indicator exceeds a normal variation threshold.

10. A sampling frequency recommendation apparatus, comprising:

a memory, configured to store computer-readable instructions; and a processor, configured to execute the instructions to:
obtain a network key performance indicator of a to-be-analyzed data stream in a network;
sample the network key performance indicator over a period of time, the sampling being based on a plurality of different sampling frequencies to obtain an experience quality sequence corresponding to each of the sampling frequencies for the period of time, wherein the plurality of different sampling frequencies comprise one standard sampling frequency and at least two to-be-tested sampling frequencies, the standard sampling frequency is greater than each of the to-be-tested sampling frequencies, the experience quality sequence corresponding to each of the sampling frequencies comprises experience quality elements of sampling periods arranged in an order of time, and the experience quality element of each sampling period is used to represent experience quality determined based on the network key performance indicator in the sampling period;
determine a matching degree between an experience quality sequence corresponding to each of the to-be-tested sampling frequencies and a standard experience quality sequence, and determine a recommended sampling frequency based on the matching degree between the experience quality sequence corresponding to each of the to-be-tested sampling frequencies and the standard experience quality sequence, wherein the matching degree corresponding to the recommended sampling frequency meets an expected condition, and the standard experience quality sequence corresponds to the standard sampling frequency; and
sample the network at the recommended sampling frequency to detect a failure of the network.

11. The apparatus according to claim 10, wherein the processor is configured to execute the instructions to:
calculate, for each of the sampling frequencies, a network throughput rate in each sampling period based on a network key performance indicator obtained through sampling at the sampling frequency, obtain a bit rate of each sampling period, and compare the network throughput rate and the bit rate in the same sampling period, to obtain experience quality elements corresponding to a plurality of sampling periods, wherein the experience quality element comprises a good quality state or a poor quality state, the good quality state represents that the network throughput rate is greater than or equal to the bit rate in the same sampling period, and the poor quality state represents that the network throughput rate is less than the bit rate in the same sampling period.

12. The apparatus according to claim 10, wherein when determining the matching degree between the experience quality sequence corresponding to the to-be-tested sampling frequency and the standard experience quality sequence, the processor is configured to execute the instructions to:
perform calculation based on the experience quality elements in the standard experience quality sequence and the experience quality elements in the experience quality sequence corresponding to the to-be-tested sampling frequency, to obtain the matching degree between the experience quality sequence corresponding to the to-be-tested sampling frequency and the standard experience quality sequence.

13. The apparatus according to claim 12, wherein a quantity of experience quality elements in the standard experience quality sequence is N, a quantity of experience quality elements in the experience quality sequence corresponding to the to-be-tested sampling frequency is M, and both N and M are positive integers; and
when performing calculation based on the experience quality elements in the standard experience quality sequence and the experience quality elements in the experience quality sequence corresponding to the to-be-tested sampling frequency, to obtain the matching degree between the experience quality sequence corresponding to the to-be-tested sampling frequency and the standard experience quality sequence, the processor is configured to execute the instructions to:
combine every N/M consecutive experience quality elements in the standard experience quality sequence into one experience quality element, wherein N/M is a positive integer; and
calculate a proportion of a quantity of target experience quality elements in a quantity of experience quality elements in the experience quality sequence corresponding to the to-be-tested sampling frequency, and use the proportion as the matching degree between the experience quality sequence corresponding to the to-be-tested sampling frequency and the standard experience quality sequence, wherein the target experience quality element is an experience quality element that is in the experience quality sequence corresponding to the to-be-tested sampling frequency and that is the same as an experience quality element of a corresponding sampling period in the standard experience quality sequence obtained after combination of the experience quality elements.

14. The apparatus according to claim 13, wherein in the standard experience quality sequence, if at least one of every N/M consecutive experience quality elements is in a poor quality state, the experience quality element obtained by combining the N/M consecutive experience quality elements is in the poor quality state.

15. The apparatus according to claim 10, wherein when determining the recommended sampling frequency based on the matching degree between the experience quality sequence corresponding to each of the to-be-tested sampling frequencies and the standard experience quality sequence, the processor is configured to execute the instructions to:
calculate, for each of the to-be-tested sampling frequencies, a statistical value of matching degrees between experience quality sequences of a plurality of the to-be-analyzed data streams corresponding to the to-be-tested sampling frequency and the standard experience quality sequence, wherein the statistical value comprises an average value or a median value;
use a to-be-tested sampling frequency whose statistical value of the matching degrees falls within an expected matching degree range as a target sampling frequency; and
use a minimum sampling frequency in the target sampling frequencies as the recommended sampling frequency.

16. The apparatus according to claim 10, wherein when determining the recommended sampling frequency based on the matching degree between the experience quality sequence corresponding to each of the to-be-tested sampling frequencies and the standard experience quality sequence, the processor is configured to execute the instructions to:
calculate, for each of the to-be-tested sampling frequencies, matching degrees between experience quality sequences of a plurality of the to-be-analyzed data streams corresponding to the to-be-tested sampling frequency and the standard experience quality sequence; and select, for each to-be-analyzed data stream, a minimum sampling frequency from the to-be-tested sampling frequencies whose matching degrees fall within an expected matching degree range, and use a most frequently selected to-be-tested sampling frequency as the recommended sampling frequency.

17. The apparatus according to claim 10, wherein the processor is configured to execute the instructions to:

select a data stream whose experience quality does not reach standard experience quality as the to-be-analyzed data stream, and obtain the network key performance indicator of the to-be-analyzed data stream.

18. The apparatus according to claim 10, wherein processor is configured to execute the instructions to:

if the expected condition is updated or a variation of the key performance indicator exceeds a normal variation threshold, trigger to redetermine the recommended sampling frequency.

19. A non-transitory computer readable medium having stored thereon instructions which, when executed by at least one processor, causes the at least one processor to cause a device:

obtain a network key performance indicator of a to-be-analyzed data stream in a network;

sample the network key performance indicator over a period of time, the sampling being based on a plurality of different sampling frequencies to obtain an experience quality sequence corresponding to each of the sampling frequencies for the period of time, wherein the plurality of different sampling frequencies comprise one standard sampling frequency and at least two to-be-tested sampling frequencies, the standard sampling frequency is greater than each of the to-be-tested sampling frequencies, the experience quality sequence corresponding to each of the sampling frequencies comprises experience quality elements of sampling periods arranged in an order of time, and the experience quality element of each sampling period is used to represent experience quality determined based on the network key performance indicator in the sampling period;

determine a matching degree between an experience quality sequence corresponding to each of the to-be-tested sampling frequencies and a standard experience quality sequence, and determining a recommended sampling frequency based on the matching degree between the experience quality sequence corresponding to each of the to-be-tested sampling frequencies and the standard experience quality sequence, wherein the matching degree corresponding to the recommended sampling frequency meets an expected condition, and the standard experience quality sequence corresponds to the standard sampling frequency; and sample the network at the recommended sampling frequency to detect a failure of the network.

* * * * *